United States Patent [19]
Gruesbeck et al.

[11] 3,915,232
[45] Oct. 28, 1975

[54] METHOD OF CONSOLIDATING INCOMPETENT FORMATIONS

[75] Inventors: Clay Gruesbeck; Christopher M. Shaughnessy, both of Houston, Tex.

[73] Assignee: Exxon Production Research Company, Houston, Tex.

[22] Filed: Aug. 27, 1974

[21] Appl. No.: 501,003

[52] U.S. Cl. .......... 166/295
[51] Int. Cl.² .......... E21B 33/138
[58] Field of Search .......... 166/295, 276, 294, 281, 166/305 R

[56] References Cited

UNITED STATES PATENTS

| | | | |
|---|---|---|---|
| 3,398,094 | 8/1968 | Blatz et al. | 166/275 X |
| 3,419,073 | 12/1968 | Brooks, Jr. | 166/295 |
| 3,437,145 | 4/1969 | Johnson et al. | 166/295 |
| 3,446,282 | 5/1969 | Cooke, Jr. | 166/274 |
| 3,481,403 | 12/1969 | Gidley et al. | 166/295 |
| 3,504,746 | 4/1970 | Freifeld et al. | 166/295 |
| 3,624,018 | 11/1971 | Eilers et al. | 166/295 |
| 3,718,189 | 2/1973 | Terry | 166/295 X |

*Primary Examiner*—Stephen J. Novosad
*Attorney, Agent, or Firm*—Robert L. Graham

[57] ABSTRACT

A method of consolidating an incompetent formation surrounding a well wherein a thickened solvent at least partially miscible with oil and water is injected into the formation; and a resin is thereafter injected into the formation to bond the formation solids in place. The preferred solvent thickening agent is a polymer of vinylpyrrolidone or derivative thereof.

22 Claims, 2 Drawing Figures

METHOD OF CONSOLIDATING INCOMPETENT FORMATIONS

BACKGROUND OF THE INVENTION

1. Field of the Invention

The present invention relates to an improved method for treating subterranean, unconsolidated formations. In one aspect, it relates to an improved method for preconditioning the formation prior to consolidating the formation with synthetic resins.

2. Description of the Prior Art

Difficulties due to solids entrained in produced fluids have led to sand control methods which employ a variety of different synthetic resins for the consolidation of incompetent subterranean formations. These methods involve the injection of a liquid resin or a resin forming material into the formation and permitting the resin to cure to an infusible state, thereby bonding the formation sand in place. In such treatments, a solvent is frequently injected as a preflush fluid into the formation to remove resident fluids and precondition the interval to be consolidated. Such preflush solvents include low molecular weight alcohols, aldehydes, ketones, and glycol ethers. The effectiveness of many of these solvents depends on their mutual solvency with oil and water which aids the miscible displacement mechanism. Improved wetting of the sand by the resin after the preflush treatment results in better resin distribution.

Tests have shown, however, that the pretreatment of the formation with the mutual solvents is not always effective in displacing oil and water from the interval to be treated. The presence of oil and/or water not only prevents effective coating of the formation particles by the resin but can drastically reduce the strength of the consolidated interval. Laboratory tests have shown that certain resins are unable to coat silica surfaces when water is present.

SUMMARY OF THE INVENTION

The present invention provides an improved preflush for sand consolidation treatments using synthetic resins. The preflushes effectively removes resident fluids from the interval to be treated and thereby improves resin distribution and consolidation strength.

Broadly, the invention involves injecting into the formation a thickened solvent, at least partially miscible with formation oil and water, and thereafter injecting a sand consolidating resin into the formation. A novel aspect of the invention involves the pretreatment of the formation with a thickened mutual solvent.

The preferred solvents include glycol ethers such as $C_1$–$C_6$ alkyl ethers of $C_2$–$C_6$ glycols and polyglycol ethers containing up to 22 carbon atoms per molecule. The solvents should include sufficient amounts of thickening agent to provide at least a 50% increase in solvent viscosity at formation temperature.

Since the function of the solvent is to displace resident fluids, e.g. oil and water, away from the formation, the thickening agent should not only provide the proper viscosity but should be miscible with salt water since formation connate water is normally brine. Polymers of pyrrolidone, particularly polyvinylpyrrolidone or derivatives thereof, are preferred thickeners. A thickening agent that has performed unusually well in the present invention is high molecular weight polyvinylpyrrolidone.

DESCRIPTION OF THE PREFERRED EMBODIMENTS

Figure 1:
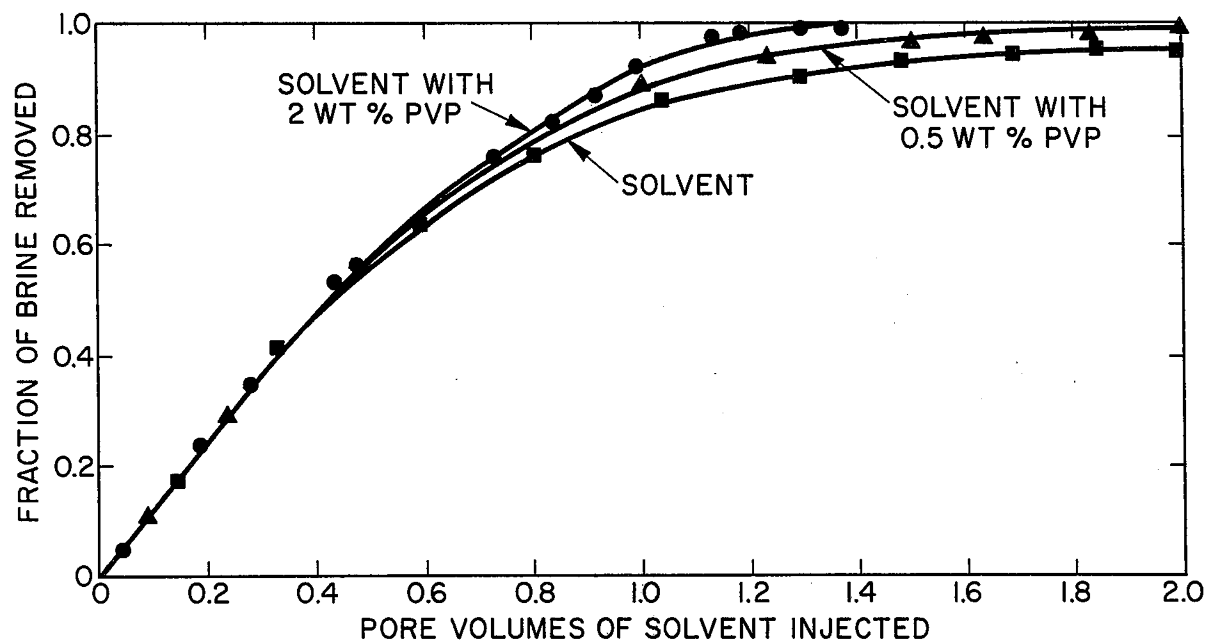
FIG. 1 is a plot comparing the displacement efficiency of brine within a porous media by a solvent with and without a thickening agent.

The solvents which exhibit some miscibility with both oil and water and which are useful in the present invention include glycol ethers, including mono and polyglycol ethers, low molecular weight alcohols such as isopropanol, and ketones such as acetone.

Because of their superior solvency for both oil and water, the glycol ethers are the preferred solvents. These glycol ethers include $C_1$–$C_6$ monoglycols and polyglycol ethers having up to 22 carbon atoms per molecule. Specific glycol ethers which are particularly useful as preflush liquids include ethers of ethylene glycol such as ethylene glycol monopropyl ether, ethylene glycol monobutyl ether, triethylene glycol monobutyl ether, tetraethylene glycol monohexyl ether. Other useful glycols ethers include ethylene glycol monomethyl ether, ethylene glycol dimethyl ether, ethylene glycol monoethyl ether, ethylene glycol diethyl ether, propylene glycol monomethyl ether, propylene glycol diethyl ether, propylene glycol monohexyl ether, butylene glycol monoethyl ether, butylene glycol dimethyl ether, butylene glycol monopropyl ether, amylene glycol dimethyl ether, hexylene glycol monomethyl ether, triethylene glycol hexyl ether, triethylene glycol decyl ether, tetraethylene glycol decyl ether, and the like. It has been found that high molecular weight glycol ethers behave as surfactants and promote the formation of oil and water emulsions. For this reason, the preferred glycol ether contains no more than 22 carbon atoms per molecule.

These materials may be used in pure form, but it is preferred that they be blended with other types of solvents such as low molecular weight alcohols or ketones. For example, the miscibility of the certain glycol ethers with water can be greatly improved by the addition of a low molecular weight alcohol, such as isopropanol. The alcohol, which is strongly hydrophilic, not only improves the mutual solvency property but reduces the cost of the solvent.

The alcohol and glycol ether may be blended in any ratio but for cost consideration, it generally is preferred to use a mixture wherein the low priced alcohol or ketone constitutes the major volume proportion of the blend.

Although the addition of the alcohol or ketones improves the mutual solvency of the treating liquid, it also reduces its viscosity. Low viscosity solvents are not always effective in removing formation oil and brine by miscible displacement because of the tendency of the solvent to finger through the high premeability intervals. Surprisingly, it has been found that the addition of thickening agents greatly improves the strength of the cured resin.

In accordance with the present invention, the use of a thickening agent provides the mutual solvent, in pure form or a blend, with sufficient viscosity to improve the miscible displacement of resident formation fluids by the solvent.

The thickening agent should be capable of substantially increasing the viscosity of the mutual solvent at moderate concentrations. Moreover, the thickening agent should be salt resistant. It is preferred that the viscous solvent have a viscosity at least equal to or greater than the viscosity of formation oil and formation temperature.

The preferred thickening agent for purposes of the present invention is polyvinylpyrrolidone (PVP), copolymers or derivatives thereof. Various grades of this material was found to be effective viscosifier for several solvents including isopropanol, ethylene glycol butyl ether, ethylene glycol isopropyl ether, and tetraethylene glycol hexyl ether. They were also found to be miscible with brine.

PVP, made from N-vinyl-2-pyrrolidone, has the following general formula:

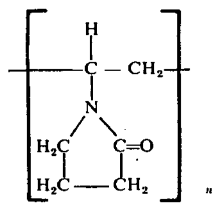

PVP is commercially available in several viscosity grades. Although all viscosity grades may be used to thicken the solvent, the high viscosity grades are preferred.

Copolymers of vinylpyrrolidone and other derivates thereof may also be used in the present invention. Such materials include alkylated polymers of vinylpyrrolidone and quaternized polymers of vinylpyrrolidone.

The amount of PVP required to impart the desired viscosity to a solvent will depend upon several factors including viscosity grade of PVP, formation temperature, desired solvent viscosity, and the type of solvent employed. As a general rule, however, from about 0.1 to 10.0 weight percent of the PVP will be satisfactory for most applications.

In carrying out the method of the present invention, it generally will be preferred to remove the producing tubing (if used) from the well and inserting a work string for cleaning out the well and for conducting treating fluids to the formation. The work string used preferably is a small diameter tubing having internally flush joints. The various fluids used in the treatment are usually injected in the following sequece: (1) preflush solvent, (2) resin solution, (3) spacer oil, (4) catalyst solution. Wiper balls or plugs may be employed in the spacer oil to ensure complete wiping of the resin from the work string to prevent it from contacting the catalyst solution.

In a typical treatment, the pumping sequence, and approximate volumes and viscosities of sand treating fluids employing an externally catalyzed epoxy resin (two-stage epoxy) will be as follows:

| | Viscosity at cp 75°F | Volume per gal foot of formation |
|---|---|---|
| Preflush solvent | 5 | 100 |
| Resin Solution | 90 | 60 |
| Spacer Oil | 120 | 40 (total) |
| Catalyst Solution | 120 | 250 |

As reflected by this sequence, it is preferred that the various solutions injected exhibit a progressively increasing viscosity. That is, the preflush solvent should have the lowest viscosity and the catalyst solution the highest viscosity.

The preflush solvent will normally be prepared by blending in the proper proportion the various materials employed. The thickener may be added to the solvent in a batch blender and agitated until completely dissolved. From about 30 minutes to about 2 hours should be sufficient for the polymer to dissolve.

The preflush solvent may be utilized in conjunction with a variety of different resinous materials including the phenolformaldehyde type resin, the epoxy type resin, and the furfuryl alcohol and urea formaldehyde type resins.

The phenolformaldehyde type resins are prepared by the reaction of formaldehyde, acetaldehyde, propionaldehyde, or a mixture of water soluble aldehydes with a low molecular weight hydroxyaryl compound such as phenol, cresol, B-naphthol, resorcinol, xylenol, cresylic acid or a mixture of such compounds in a weight ratio between 1:1 and 9:1. The reaction of these materials can be catalyzed by the addition from about 2 to about 10% by weight based on the aldehyde hydroxyaryl compound mixture of an alkaline catalyst or an acid catalyst. The types and amounts of the catalyst and the composition of the phenolformaldehyde resins have been described at length in the art and are well known to those skilled in the art.

The epoxy resin useful for the purpose of this invention includes the diglycidyl ethers of bisphenol-A [bis(4-hydroxy phenol) dimethyl methane] obtained by the reaction of epichlorohydrin (1-chloro-2,3 epoxy propane) and bisphenol-A in the presence of an alkali such as sodium hydroxide or potassium hydroxide. Similar resins can be prepared by reacting mononuclear di- or tri- hydroxy phenol such as resorcinol, hydroquinone, pyrocatechol, or phloroglucinol or a polynuclear polyhydroxy phenol such as 4,4-dihydroxy biphenyl with a halohydrin such as 1,2-dichloro-3-hydroxy propane or dichlorohydrin. Still other satisfactory materials include the commercial epoxy resins prepared by the condensation of novolac resins with epichlorohydrins.

The epoxy resins are cured by curing agents or catalysts. Amine catalysts such as diethylene triamine, ethylene diamine and the like may be employed. Also usable are acidic catalysts including oxalic acid, phthalic acid and the like.

The epoxy resins may be used in a single stage operation wherein a mixture of the resin in a suitable diluent such as alcohol, acetone, methyl ethyl ketone, or dispersed in kerosene, diesel oil, or white oil or mixtures of these materials, along with the catalyst is injected into the formation. Alternatively, the epoxy resins may be placed in a two-stage operation where the resin dispersed in a suitable diluent is injected into the formation followed by the catalyst or curring agent dissolved in a hydrocarbon carrier such as white oil. The catalyst solution displaces the resin into the formation and imparts the desired permeability to the invaded pore spaces. The catalysts (or curing agent) is extracted by the resin in contact with the sand grains. This causes the resin to harden, bonding the sand grains together.

The furfuryl alcohol formulations are generally utilized by injecting furfuryl alcohol, furfuryl alcohol resins or a mixture of the alcohol and resin into the formation and thereafter pumping in an oil overflush solution containing a low molecular weight organic acid such as trichloroacetic acid or delayed acid producing chemical as a catalyst or curing agent.

The urea formaldehyde resins are employed by injecting an aqueous solution containing urea, formaldehyde, an accelerator such as ammonium sulphate or ammonium chloride, and a retarder such as ammonium hydroxide hexamethylene tetramine into the formation and allowing the material to set. Magnesium chloride or similar chloride salt can be added to facilitate polymerization in carbonate formations.

The various resins, resin solutions, catalyst solutions, and overflush solutions employed in such treatments may also include other additives such as coupling agents. The volumes of resin solution, mixing techniques and injection procedures for the above resin type treatments have been described at length in the literature and are well known to those skilled in the art. Most of the resin types described above are commercially available from various service companies.

As mentioned previously, polyethylene glycol ethers are the preferred preflush solvents for use in sand consolidation treatments. These materials may be employed either in undiluted form or in a suitable organic diluent such as a $C_1$–$C_4$ alkyl alcohol, acetone and ethylene glycol monobutyl ether or hydrocarbon oil. The preferred diluent is isopropanol present in an amount to provide a polyglycol ether/alcohol weight ratio of 1:1 to 1:10. As mentioned previously, the diluent particularly isopropanol not only reduces the cost of the solvent but improves the hydrophilic character of the solvent. The quantity required for optimum results will normally depend, in part, on the permeability, porosity, and clay content of the formation, on the composition of the fluids in the formation, upon the particular polyglycol ethers or ether solutions selected, or upon particular resins or mixtures of resins forming constituents to be used. Use of from about 10 to about 100 gallons per foot formation thickness of polyethylene glycol alkyl ether may be employed in undiluted form. If diluted, the treatment volumes required to achieve the desired results may be somewhat larger. For example, a 3:1 blend (by weight) of isopropanol and polyglycol ether may require from 50 to 200 gallons per foot of formation thickness.

It should be noted that the sand consolidation treatment may be used with other well treatments such as sandstone acidizing. It has been found that by treating the formation with HCl and mud acid, materials such as iron oxide or other materials that would affect the wettability or bonding of the resin to the sandstones are removed. In addition, pretreatment with acid solution removes clays, salts and other fines that could detrimentally affect the consolidation by resins.

The present invention may also be employed in the placement of sand or resin coated sand in surrounding relation to the wellbore and thereafter treating with the preflush and sand consolidating agents.

LABORATORY TESTS

A set of laboratory experiments were conducted to determine (1) the miscibility of various polymers with various organic solvents and brine, (2) the ability of thickened and unthickened solvents to displace fluids in core samples and (3) the effect of various solvents on the strength of consolidated samples.

The first group of tests were bottle tests to determine miscibility of 1 weight percent of a polymer in (a) a mutual solvent and (b) brine. About 0.1 grams of the polymer were mixed with 10 grams of solvent or brine. If the polymer did not solubilize readily, the sample was agitated overnight. Mutual solvents used in these tests were isopropanol, ethylene glycol butyl ether, ethylene glycol isopropyl ether and tetraethylene glycol hexyl ether. The brine was 6 wt% Na*Cl*. Miscibility with the test liquid (solvent or brine) was determined on the basis of visible undissolved polymer and thickening effect on the liquid. The following table presents these results.

| Chemical Composition | Trade Name | Manufacturer | Solubility | |
|---|---|---|---|---|
| | | | Mutual Solvents | Brine |
| Polyvinylpyrrolidone | PVP K-90 (MW 360,000) | GAF Corp. | Yes | Yes |
| Polyvinylpyrrolidone | PVP K-60 (MW 160,000) | GAF Corp. | Yes | Yes |
| Polyvinylpyrrolidone | PVP K-30 (MW 40,000) | GAF Corp. | Yes | Yes |
| Polyvinylpyrrolidone | PVP K-15 (MW 10,000) | GAF Corp. | Yes | Yes |
| Quaternized polyvinylpyrrolidone | Gafquat 755 | GAF Corp. | Yes | Yes |
| Poly (methyl vinyl ether) | Gantrez M-154 | GAF Corp. | Yes | No |
| Hydroxypropyl cellulose | Klucel 6H | Hercules | Yes | Slightly |
| Hydroxypropyl cellulose | Klucel H | Hercules | Yes | Slightly |
| Poly (ethylene oxide) | Polyox WSR 35 | Union Carbide | No at 70°F<br>Yes at 140°F | Slightly<br>Slightly |
| Hydroxypropyl methylcellulose | Methocel HG | Dow | No | No |
| Polyacrylamide | P200 | Dow | No | No |
| polyacrylamide | Reten A-01 | Hercules | No | No |
| Hydroxyalkyl Guar | Jaguar HE-1 | Stein-Hall | No | No |
| Poly (vinyl alcohol) | Elvanol L4A-097 | DuPont | No | No |
| Poly (methyl vinyl ether/ maleic anhydride) | Gantrez AN 4651 | GAF Corp. | No | No |
| Heteropolysaccharide | XC Biopolymer | Kelco | No | No |

Figure 2:
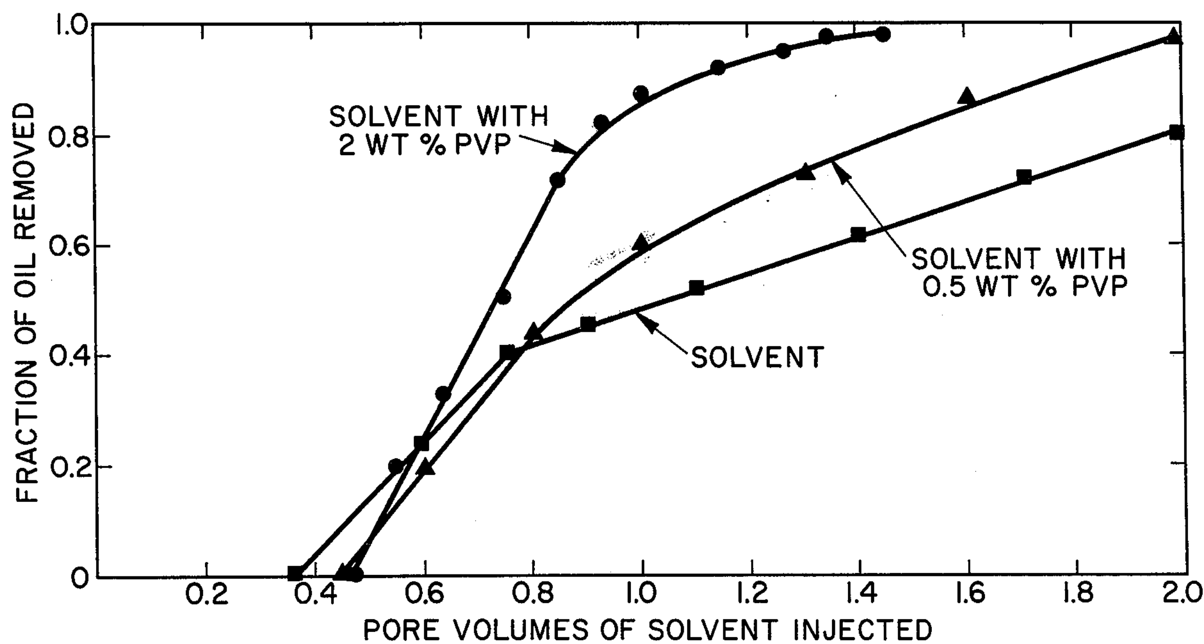
FIG. 2 is a plot comparing displacement efficiencies of oil within a porous media by a solvent with and without a thickening agent.

The second group of tests determined the effectiveness of the thickened solvent to remove oil and water from core samples. Brazos River sand was packed into three rubber sleeve tubes 48 inches long and 1 inch in diameter. Each of the tubes was saturated with salt water and then flooded with No. diesel oil and salt water to provide a residual oil saturation. of 20% pore volume. A solvent was injected into each sample to displace the oil and water. The pore volumes of solvent injected was measured and the effluent of each core was collected and its composition determined. FIGS. 1 and 2 illustrate the amount of oil and water displaced as a function of pore volumes of solvent injected. The following table compares the viscosity of the various preflush solvents employed in the experiments.

| Solvent | Thickener | Weight Percent | Viscosity at 140°F Centipois |
|---|---|---|---|
| Ethylene Glycol Isopropyl Ether | None | — | 1.0 |
| Ethylene Glycol Isopropyl Ether | PVP (K-90) | 0.5 | 2.5 |
| Ethylene Glycol Isopropyl Ether | PVP (K-90) | 2.0 | 11.7 |

From the plots presented in FIGS. 1 and 2, it can be seen that the displacement of resident fluids in the sample by solvent goes through four distinct stages. Initially, only the mobile fluid, brine in this case, is displaced. After about 0.4 to 0.5 pore volumes of solvent injection, oil and brine are displaced. Solvent breakthrough occurs from about 0.7 pore volumes of the unthickened solvent to about 0.8 pore volumes for viscous solvents. The final stage is the miscible displacement of connate or residual brine in the sample. It can be seen that the solvent with 2 wt% PVP displaced about 93 percent of the brine in place whereas the unthickened solvent displaced only about 83 percent of the brine in place at 1.0 pore volumes of solvent injection. The removal of the additional water by the viscous solvent is extremely important because of the adverse effect that water has on the cure strength or bonding strength of resins. The viscous solvent not only displaces the oil and brine more efficiently than unthickened solvent but reduces residual saturation of both of these fluids to levels which are attainable only by use of excessive amounts of unthickened solvents. The displacing efficiency of the viscous solvents permits them to be used at moderate volumes—e.g. 50–100 gallons per foot of treated interval.

Additional tests were run to determine the effect of viscous preflush solvents and sand consolidations using an epoxy resin. The samples treated consisted of Brazos River sand packed into a rubber sleeve 48 inches long and 1½ inches in diameter. Initially, the samples were saturated with brine and were flooded with 300 cc of No. 2 fuel oil and then with 1000 cc of brine. The unconsolidated sample was first treated with an acid to condition the sand for treatment with the epoxy resin—115 cc of 15% aqueous HCl was injected into the sample followed by the injection of 460 cc of mud acid (12% HCl and 3% HF). A total of 115 cc of a solvent was then injected into each sample— one sample was treated with a solvent containing no thickener, and the other sample with a solvent containing 0.5 wt% of PVP. Following the injection of the solvent, a total of 275 cc of an epoxy solution was injected and was followed by a white oil containing 2.5% of a tertiary amine which served as the catalyst. The sand samples were permitted to cure for 18 hours at 140°F.

Following the cure, each sample was removed from the sleeve and cut at 2 inch intervals along the axis of the samples for compression test. The 2 inch cylindrical samples were each placed between plates and the compressive axial force was applied until the sample cracked. The load was recorded for each sample and the failure pressure calculated. The following table presents the compressive test data.

| Location of Test Sample from Injection Point (Inches) | Compressive Strength at Failure (Psi) — Treated with ethylene glycol isopropyl ether: Without Thickener | Compressive Strength at Failure (Psi) — Treated with ethylene glycol isopropyl ether: With 0.5wt % PVP (K-90) |
|---|---|---|
| 3 | 5000 | 8100 |
| 5 | 5000 | 8100 |
| 9 | 6400 | 8700 |
| 15 | 4400 | 8400 |
| 21 | 3400 | 8400 |
| 27 | 1600 | 6400 |
| 33 | 1000 | 2900 |
| 39 | Unconsolidated | 1400 |
| 48 | Unconsolidated | 300 |

The compressive data above clearly shows that the thickened preflush solvent had a significant effect on the strength of the samples as well as the penetration of the epoxy resin. It should be emphasized that the only difference between the two treatments was the addition of the thickening agent to the preflush.

Although the laboratory experiments described above have employed an epoxy resin, it will be appreciated by those skilled in the art that the thickened solvent may be used with advantage as a preflush for other consolidating resins such as those previously described.

FIELD TEST

The following field test illustrates a specific procedure for performing the method of the present invention. An offshore well completed in a 4 foot interval at about 7800 feet was not capable of sustaining production for long periods of time because of sand problems. A 1-inch work string was placed in the well and brine circulated therethrough to remove sand from the wellbore. A slurry of 40–60 mesh sand and brine was injected through the perforations and pressure packed in place. Diesel oil was then used to displace the brine. Following an injectivity test to insure that the perforations were open, pumping operations were commenced. The pumping schedule was as follows:

| | Quantity | Tradename or Type | Supplier |
|---|---|---|---|
| Preflush Solvent | | | |
| Ethylene glycol isopropyl ether | 400 gal | Solvent AC | Union Carbide |
| PVP | 16 lb | NP(K-90) | GAF Corp. |
| Resin Solution | | | |
| Epoxy (di glycidal ether of bisphenol A) | 200 gal | Araldite 6005 | Ciba-Geigy Co. |
| Diluent | 50 gal | Acetone | |
| Coupling Agent | 1 gal | Z-6020 | Dow Chemical |
| Spacer Fluid | | | |
| White oil | 42 gal | WS 3057 | Exxon Co, USA |
| Catalyst Solution | | | |
| White oil | 1000 gal | WS 3057 | Exxon Co, USA |
| Catalyst (tertiary amine) | 25 gal | DMP-30 | Rohm and Haas |

The various liquids were injected through the work string and into the formation in the above sequence at a rate of about 10 gallons per minute. Three wiper balls were included in the spacer fluid to segregate the resin solution and the catalyst solution. The final solution was displaced from the workover string with diesel oil and the well was shut in to permit the resin to cure. When the well was returned to production, produced fluids were sand free indicating initial success of the treatment.

The laboratory tests and actual field test described above, respectively demonstrate the benefits and applicability of viscous preflushes in sand consolidation treatments.

We claim:

1. In a method for the consolidation of an incompetent subterranean formation surrounding a well wherein a resinous material is injected into the formation and allowed to harden, the improvement which comprises, prior to injecting said resin material, injecting into said formation a solvent at least partially miscible with oil and water, said solvent containing an effective amount of a polymer of pyrrolidone capable of increasing the viscosity of said solvent.

2. A method as defined in claim 1 wherein the solvent includes a glycol ether.

3. A method as defined in claim 2 wherein the polymer is selected from the group consisting of polymers, copolymers and derivatives of vinylpyrrolidone.

4. A method as defined in claim 3 where the polymer is polyvinylpyrrolidone.

5. A method as defined in claim 2 where said solvent further includes an alcohol.

6. A method as defined in claim 2 wherein the glycol ether is an alkyl ether of ethylene glycol containing no more than 22 carbon atoms per molecule and said polymer is selected from the group consisting of polyvinyl pyrrolidone, and copolymers and derivatives of vinyl pyrrolidone.

7. A method as defined in claim 6 wherein the glycol ether is a $C_1$–$C_6$ alkyl ether of a $C_2$–$C_6$ glycol.

8. A method as defined in claim 7 wherein glycol ether is ethylene glycol monobutyl ether.

9. A method as defined in claim 7 wherein the glycol ether is ethylene glycol isopropyl ether.

10. A method as defined in claim 2 wherein the glycol either is a monoalkyl ether of a polyglycol.

11. A method as defined in claim 2 wherein the glycol ether is a $C_4$–$C_8$ monoalkyl ether of tri or tetraethylene glycol.

12. A method as defined in claim 2 wherein the solvent further includes a low molecular weight alcohol and said polymer is capable of thickening both the glycol ether and the alcohol.

13. A method as defined in claim 12 wherein the alcohol is isopropanol.

14. A method as defined in claim 2 wherein the polymer of pyrrolidone is selected from the group consisting of polyvinyl pyrrolidone, copolymers of vinyl pyrrolidone, and derivatives of vinyl pyrrolidone.

15. A method as defined in claim 14 wherein the concentration of the polymer in the solvent is from about 0.1 to about 10 weight percent based upon the weight of the thickened solvent.

16. A method as defined in claim 1 wherein the concentration of the polymer in the solvent is sufficient to increase the solvent viscosity by at least 50% at formation temperature.

17. A method of consolidating an incompetent subterranean formation surrounding a well which comprises injecting into said formation a solvent which includes an alkyl ether of ethylene glycol, at least partially miscible with oil and brine and containing an effective amount of a polymer of pyrrolidone capable of substantially increasing the viscosity of said solvent; and thereafter injecting a resinous material into said formation; and thereafter causing said resinous material to harden to an infusible condition.

18. A method as defined in claim 17 wherein the solvent further includes an alcohol.

19. A method as defined in claim 17 wherein the polymer is selected from the group consisting of polyvinylpyrrolidone, copolymers and derivatives of vinyl pyrrolidones.

20. A method as defined in claim 19 wherein the polymer is polyvinylpyrrolidone and is present in the solvent in sufficient concentration to provide the solvent with a viscosity of at least equal to that of formation oil at the temperature of said formation.

21. A method as defined in claim 17 wherein the alkyl ether of ethylene glycol contains no more than 22 carbon atoms per molecule.

22. A method as defined in claim 17 wherein the resinous material is a liquid epoxy resin.

* * * * *